United States Patent

Dwyer, Jr.

[11] Patent Number: 5,967,171
[45] Date of Patent: Oct. 19, 1999

[54] SHUT-OFF SYSTEM FOR PREVENTING WATER DAMAGE

[76] Inventor: George W. Dwyer, Jr., 5605 NW. 8th St., Margate, Fla. 33063

[21] Appl. No.: 09/092,119

[22] Filed: Jun. 5, 1998

Related U.S. Application Data

[63] Continuation-in-part of application No. 08/820,478, Mar. 18, 1997, abandoned, which is a continuation-in-part of application No. 08/701,345, Aug. 22, 1996, abandoned.

[51] Int. Cl.⁶ .................................................. F16K 37/00
[52] U.S. Cl. ........................ 137/78.1; 137/312; 361/178; 251/292
[58] Field of Search .................. 137/78.1, 312; 307/118; 340/605; 361/178; 251/292

[56] References Cited

U.S. PATENT DOCUMENTS

| | | | |
|---|---|---|---|
| 3,803,385 | 4/1974 | Klinefelter | 200/61.04 |
| 3,979,569 | 9/1976 | Bilgrei . | |
| 4,095,458 | 6/1978 | Wild | 73/73 |
| 4,297,686 | 10/1981 | Tom . | |
| 4,488,567 | 12/1984 | Grant | 137/78.1 |
| 4,800,372 | 1/1989 | Poteet . | |
| 4,940,861 | 7/1990 | Rizzuto . | |
| 4,973,947 | 11/1990 | Tax . | |
| 5,008,650 | 4/1991 | Hoiberg . | |
| 5,029,605 | 7/1991 | Dowling et al. . | |
| 5,101,083 | 3/1992 | Tyler et al. . | |
| 5,240,022 | 8/1993 | Franklin . | |
| 5,251,653 | 10/1993 | Tucker et al. . | |
| 5,409,037 | 4/1995 | Wheeler et al. | 137/551 |

*Primary Examiner*—A. Michael Chambers
*Attorney, Agent, or Firm*—Bowen, Lhota & Firtell, P.A.; Mark D. Bowen

[57] ABSTRACT

A system for use with a normally open manually actuated water valve, or any other suitable manually actuated device, for automatically closing the valve, or device, upon sensing water. The system includes at least one water sensor electrically connected to a motorized actuator mounted on the valve, or device, whereby a signal is transmitted either by electrical conductor, or in an alternate embodiment by RF transmission, to the motorized actuator upon sensing water, whereby said manual valve is automatically actuated to its closed position. The system may be installed on an otherwise conventional manual shut-off valve, without replacing the valve or otherwise interrupting flow through the valve.

11 Claims, 7 Drawing Sheets

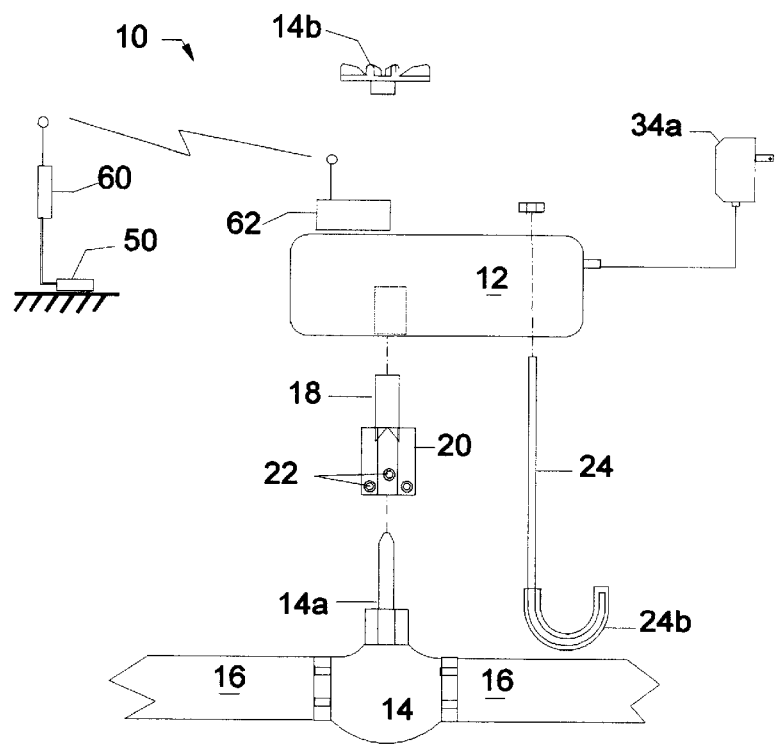
FIG. 5A
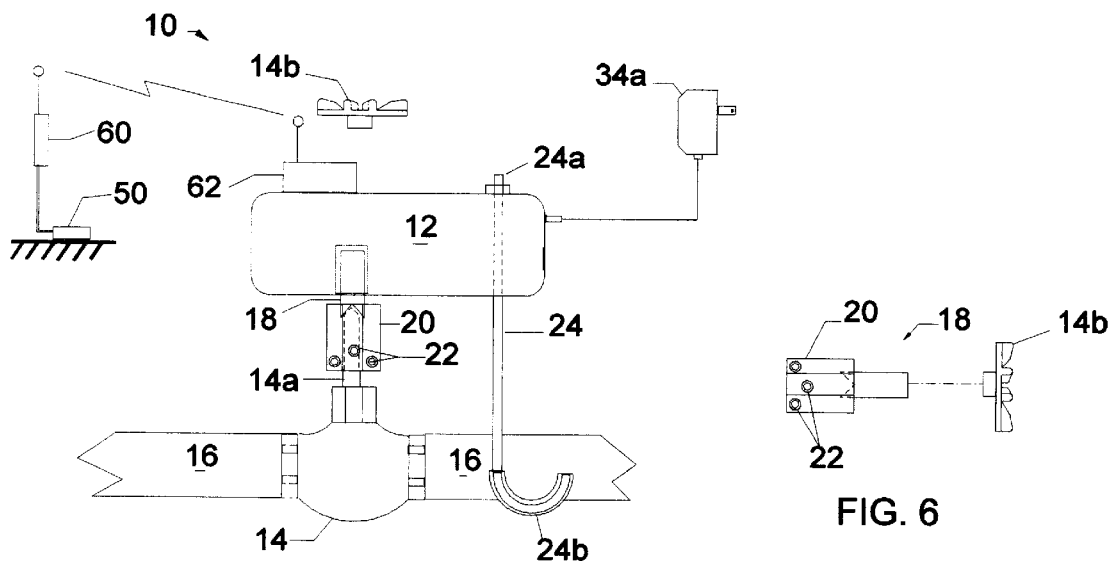
FIG. 5B
FIG. 6

SHUT-OFF SYSTEM FOR PREVENTING WATER DAMAGE

This application is a continuation-in-part of Ser. No. 08/820,478, filed Mar. 18, 1997, which is a continuation-in-part of Ser. No. 08/701,345, filed Aug. 22, 1996, both now abandoned.

BACKGROUND OF THE INVENTION

1. Field of the Invention

The present invention relates to a system for preventing the flooding of a dwelling, and, more particularly, to an apparatus for generating a mechanical output responsive to the presence of leaking water to prevent water damage.

2. Description of the Background Art

The flooding of dwellings caused by a failure in the water supply system is a well known problem. Specifically, broken water lines, or the failure of appliances such as hot water tanks and automatic washers, have been responsible for extensive property damage caused by the internal flooding of a dwelling. Such a problem can be further exacerbated in multi-story structures where there are numerous hot water tanks, each of which expose multiple units to potential water damage.

Accordingly, a number of devices are known in the prior art for shutting off water flow in a dwelling in the event of an internal rupture in the plumbing system. U.S. Pat. No. 5,008,650, issued to Hoiberg, discloses a battery-powered, liquid-detection alarm and shut-off system including an elongated sensor, an electronic controller, and a spring biased shut-off valve assembly. However, the system disclosed by Hoiberg requires the installation of a specialized shut-off valve assembly in the plumbing system thereby complicating installation.

Another prior art device is disclosed in U.S. Pat. No. 4,297,686, issued to Tom, which discloses a resistive liquid detection and shut-off system used to protect a floor area from water damage. Tom also teaches a system requiring extensive installation and wiring from the liquid sensor to a specialized water shut-off solenoid valve which must be installed in the plumbing system. In addition to the disadvantages of having to install a specialized solenoid valve, the fact that solenoid valves require continuous electrical current to operate mandates additional wiring. Furthermore, Tom teaches use of a tape water sensor which would have to be run throughout the dwelling and is subject to failure in the event of a break in the tape.

Yet another prior art device is disclosed in U.S. Pat. No. 5,240,022, issued to Franklin. The Franklin device also requires the installation of a specialized spring loaded ball valve in the water supply line; such installation requirements result in a system that can not be easily moved from one appliance or structure to another. Finally, the Franklin system does not preserve full manual actuation of the valve.

U.S. Pat. No. 5,409,037, issued to Wheeler et al., discloses an automatic device for the detection and shutoff of excess water in pipes using a microphone. The Wheeler device has a complex control panel and a motorized actuator mounted and anchored to a manual valve stem using sheet metal screws and a metal bracket. The Wheeler device, however, detects water flow within a pipe and does not detect water leaking from a pipe. Furthermore, the Wheeler device is not sufficiently sensitive to detect small (pin hole) leaks which result in insignificant overall flow within a pipe, and is overly sensitive to large leaks, and further provides no protection when turned or scheduled off. Furthermore, in a residential application it may be desirable to turn the Wheeler device off for substantial portions of time to allow for water usage around the clock.

U.S. Pat. No. 4,488,567, issued to Grant, discloses an automatic valve closer mounted and anchored to a valve by a complex metal bracket. The valve closer disclosed by Grant is triggered by an electrolytic switch which includes a container having salt and a pair of contacts therein such that leaked water entering the container causes the salt to dissolve forming an electrolytic solution that conducts electric current and closes the circuit. Grant, however, does not disclose the structure of such a salt filled container and it is believed that such a triggering mechanism suffers from disadvantages relating to sensitivity and reliability. In addition, the metal bracket mounting assembly disclosed by grant results in metal to metal contact with the pipe system thereby causing corrosion of the water pipe from an electrolytic reaction between the pipe and the metallic bracket components.

A number of other patented devices suffer from similar disadvantages, as well as a number of additional shortcomings. For example, many prior art devices contemplate an alarm as the main function thereby leaving the possibility of extensive damage if triggered when the dwelling were vacant or if the alarm were not heard. Further, many prior art devices are designed to protect one relatively small area, and others have proven too complex or difficult to install, and, have not gained wide acceptance. It is to these prior art disadvantages that the present invention is directed.

SUMMARY OF THE INVENTION

An apparatus for use with a manual water valve having a rotatable valve stem, for preventing water damage by automatically closing the water valve upon sensing water leaking from a source downstream from said water valve. The apparatus comprises at least one water sensor including a housing having a pair of opposing side walls, at least one of the side walls having a lower edge defining a notch, the housing further has a normally open mechanical switch including a pair of relatively movable switch elements and a pair of hygroscopic wafers associated therewith, the wafers have the characteristic of expansion upon exposure to water, each of the wafers being disposed between one of the side walls notches and one of the movable switch elements, whereby expansion of either one of the wafers closes the switch.

The apparatus further incorporates means for transmitting rotational torque including an electric motor and a mechanical couple between the motor and the valve stem. The means for transmitting rotational torque is electrically connected to at least one water sensor whereby closure of the sensor's switch completes an electrical circuit thereby activating the means for transmitting rotational torque and rotating the valve stem. The mechanical couple includes a shaft having a first end and a second end, the first end includes a valve stem connector defining a valve stem receiving aperture for receiving a valve stem therein and further includes means for anchoring the valve stem to the connector, whereby rotation of the shaft closes the valve.

In an alternate embodiment the water sensor comprises a resistive sensor and includes a pair of spaced conductors electrically connected to a resistance measuring circuit. When a uniform body of water bridges the gap between the spaced conductors the resistance measuring circuit completes an electrical circuit thereby activating a means for transmitting rotational torque and rotating the valve stem.

It is an object of the present invention to provide a device which shuts-off water flow in the event of a rupture in the plumbing system thereby saving property from extensive water damage.

It is a further object of the present invention to provide a device which allows for the placement of one or more remote water sensors throughout a structure thereby protecting a large area.

Yet another object of the present invention is to provide a water shut-off system which incorporates an automatic valve shut-off device which may be installed on an otherwise conventional manual shut-off valve, without the need for replacing the valve, while preserving the ability to manually actuate of the valve.

Still another object of the present invention is to provide a water shut-off system which may be installed by anyone without the need for plumbing or electrical expertise, and which may be easily removed and re-installed at another location by the owner.

Yet another object of the present invention is to provide one or more reliable water sensors capable of activating water shut-off hardware mounted on a conventional manual shut-off valve using either radio frequency signalling or signals transmitted over conductors.

Still another object of the present invention is to provide a water shut-off device wherein an embodiment does not require radio frequency signalling to activate shut-off hardware mounted on a manual shut-off valve.

It is a further object of the present invention to provide a water triggered automatic shut-off device that is adaptable for actuating a wide variety of mechanical actuators and capable of opening and/or closing doors and windows and the like.

In accordance with these and other objects which will become apparent hereinafter, the instant invention will now be described with particular reference to the accompanying drawings.

BRIEF DESCRIPTION OF THE DRAWINGS

FIG. 5A is an exploded side elevational view of an alternate embodiment of the present invention.

FIG. 5B is a side elevational view of the alternate embodiment depicted in FIG. 5A.

FIG. 6 is a side elevational view of a valve stem connector and shaft of the present invention.

DESCRIPTION OF THE PREFERRED EMBODIMENTS

Figure 1A:
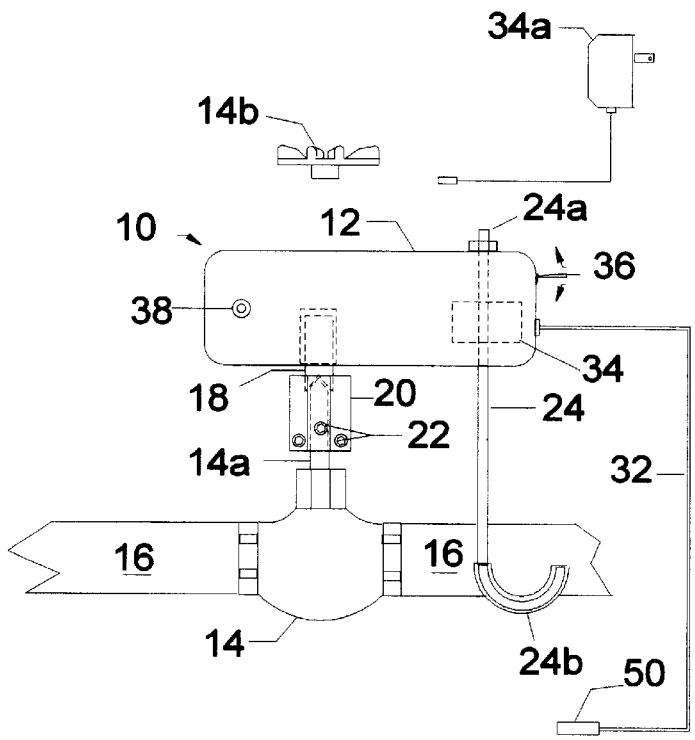
FIG. 1A is a side elevational view of a preferred embodiment of the present invention installed on a water valve.
Figure 1B:
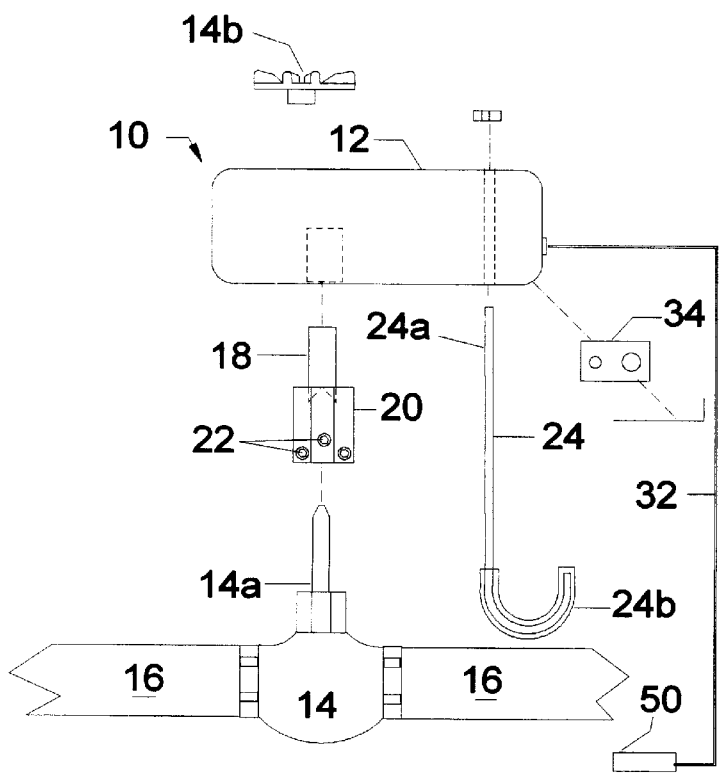
FIG. 1B is an exploded view of the side elevational view of FIG. 1A.

FIGS. 1A and 1B depict the preferred embodiment of the present invention comprising a water triggered automatic shut-off device for use with a manual water valve, generally referenced as 10, and including a motorized actuator 12 for use with a manually actuated water valve 14 having a valve stem 14a, existing in a water supply line 16.

Motorized actuator 12 is connected to a shaft 18 for transmitting rotational force to valve stem 14a for selectively closing valve 14. It should be noted that the present invention is suitable for use with any rotatably actuated actuator (e.g. window crank). Therefore, while the preferred embodiment shall be described in connection with a manual water valve, the advantages of the invention may be realized with other actuators. Furthermore, a mechanical spring loaded actuator, in lieu of an electric motor, is considered within the scope of the invention.

Shaft 18 is mechanically connected to actuator 12 and transmits rotational torque upon actuation of motorized actuator 12. Shaft 18 includes a valve stem connector 20 including a plurality of set-screws 22 for rigidly connecting valve stem connector 20 to valve stem 14a. Motorized actuator 12 is rotationally anchored with respect to valve 14 by a rigid member, such as anchor 24.

In the preferred embodiment anchor 24 comprises a J-shaped bolt, having a first end 24a rigidly connected to actuator 12 and a second end 24b connected to water line 16, for rotationally anchoring actuator 12 relative to valve 14 and water line 16. The device further includes at least one water sensor 50 electrically connected to actuator 12 by electrical conductors 32. Water sensor 50 functions to energize actuator 12 upon sensing water such that actuator 12 generates rotational torque which is transmitted via shaft 18 and connector 20 to valve stem 14a thereby closing the valve.

In the preferred embodiment, motorized actuator 12 comprises a housing containing a battery power source 34 for powering an electric motor contained therein. The use of battery 34 eliminates the need for electrically connecting actuator 12 to an electrical outlet or other power source. However, the present invention contemplates an alternate power supply configuration wherein an A.C. power cord 34a is connected to a conventional alternating current power source thereby providing power for motorized actuator 12.

Figure 2A:
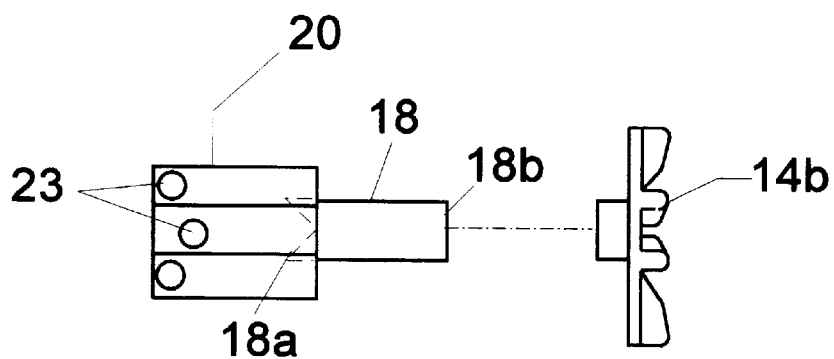
FIG. 2A is a side elevational view of a shaft and connector for anchoring a valve stem and transmitting rotational torque thereto.
Figure 2B:
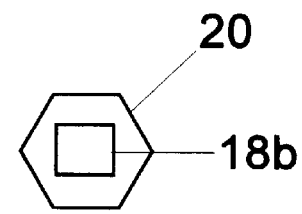
FIG. 2B is rear end view of the shaft and connector depicted in FIG. 2A.
Figure 2C:
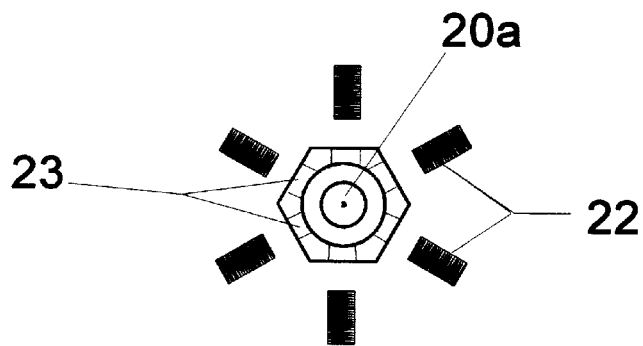
FIG. 2C is a front end view, partially exploded, of the shaft and connector depicted in FIG. 2A.

As best depicted in FIGS. 2A–C, shaft 18 provides means for transmitting rotational force from motorized actuator 12 for actuating manual valve 14. Shaft 18 comprises an elongate, rigid, shaft body, having first end 18a, a valve stem connector 20, and a second end 18b for connection to motorized actuator 12. Shaft second end 18b preferably has a generally square cross-section for being received, in locking engagement, within a generally square cross-sectional aperture defined in motorized actuator 12. While shaft end 18b is square in the preferred embodiment, it should be apparent that any cross-sectional shape capable of locking engagement with the motorized actuator is within the scope of the invention.

In the preferred embodiment, valve stem connector 20 defines an axial opening 20a extending therethrough for mating engagement with a valve stem, and includes a plurality of locking set-screws 22, received within threaded apertures 23 defined by connector 20, for rigidly anchoring a valve stem 14a to connector 20. In the preferred embodiment, set-screws 22 comprise fine machined threaded set-screws having generally blunt tips. The use of finely threaded blunt tipped set-screws is advantageous over other set-screws, such as sheet metal screws, due to the mechanical advantageous of a high thread count and blunt tip for increased surface contact. While the invention contemplates the use of set-screws 22 for anchoring valve stem 14a and connector 20, any suitable mechanical fastening configuration is considered within the scope of the invention. In the preferred embodiment, connector opening 20a is generally circular in cross section and suitably sized for receiving a valve stem therein. It has been found that valve stems existing on manual valves are typically either ⁵⁄₁₆" and ⅜" outer diameter ("O. D."), therefore, connector opening 20a is sized for receiving at least a ⅜" O. D. valve stem, however, any suitable dimensions are within the scope of the present invention.

Shaft first end 18a terminates in an end portion received within connector 20, which end portion defines an axial depression which functions to axially center a valve stem 14a relative to shaft 18 thus resulting in the axial alignment of shaft 18 and valve stem 14a. The depression may be concave, conical, tapered or any other suitable shape provided the shape facilitates the centering of valve stem 14a relative to shaft 18. In the preferred embodiment, connector 20 defines a hexagonal outer surface and further includes a plurality of threaded apertures 23 for receiving threaded set-screws 22 therein for engaging and rotationally and axially anchoring the valve stem received within axial opening 20a. FIG. 2C shows an end view of connector 20 and details set screw apertures 23 and threaded set screws 22, and axial aperture 20a. Accordingly, connector opening 20a, second shaft end 18b and set-screws 22 cooperate to maintain valve stem 14a in fixed axial alignment with shaft 18.

In the preferred embodiment, set screw apertures 23 are longitudinally or axially off-set from one another along the length of connector 20 as best seen in FIG. 2A. The off-set of set-screw apertures results in set-screws 22 contacting an inserted valve stem 14a at spaced longitudinal locations along the valve stem. Having the set-screws engage the valve stem at spaced longitudinal points is important since valve stems are typically formed from relatively soft metal in which grooves are easily formed, and the off-set configuration results in a rigid connection which resists rotational slip between the stem 14a and connector 20. Thus, the off-set set screw configuration prevents aligned set-screws from slipping on the soft metal and forming a groove on valve stem 14a which would allow the connector to rotate relative to valve stem 14a and fail to close the valve. The off-set configuration thus decreases the chance that the motorized actuator will fail to close the valve due to slipping between connector 20 and valve stem 14a.

As further depicted in FIG. 1, J-shaped anchor 24 may be attached to motorized actuator 12 at one end, and engage a section of pipe forming water supply line 16 at the other end, for rotationally securing motorized actuator 12 relative to manual valve 14. In the preferred embodiment, J-shaped anchor 24 is fabricated from metal having at least a portion thereof with an external coating of non-metallic material, such as plastic 24b', to prevent corrosion of the water pipe caused by an electrolytic reaction between the pipe and the metallic J-shaped anchor. Accordingly, it is apparent that only the portion of anchor 24 contacting the water pipe need be coated, however, the entire anchor may be coated. In the preferred embodiment, actuator 12 defines at least one aperture therethrough such that a portion of anchor 24 may be received therein and fixed thereto as best depicted in FIGS. 1A and 1B. It should be noted that the present invention contemplates that anchor 24 may be fixed to an alternate rigid structure, in lieu of water supply line 16. For example, it may be desirable to attach anchor 24 to a rigid structure such as a wall or other rigid anchoring point.

Figure 3A:
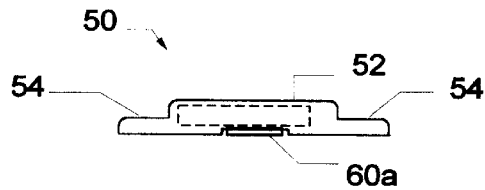
FIG. 3A is a right side elevational view of a water sensor having a normally open switch configuration.
Figure 4A:
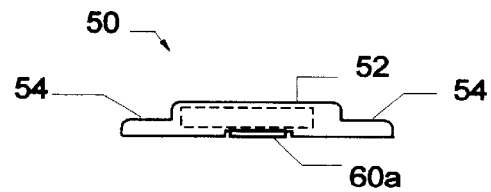
FIG. 4A is a right side elevational view of a water sensor having a normally closed switch configuration.
Figure 3B:
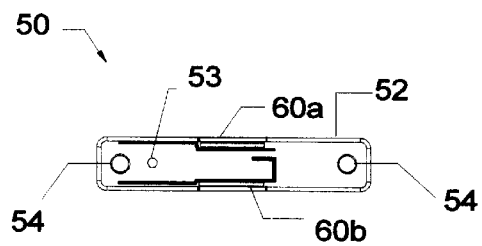
FIG. 3B is a bottom plan view of the water sensor shown in FIG. 3A.
Figure 4B:
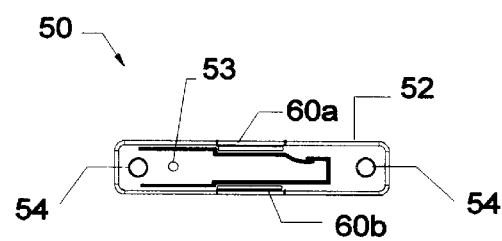
FIG. 4B is a bottom plan view of the water sensor shown in FIG. 4A.
Figure 3C:
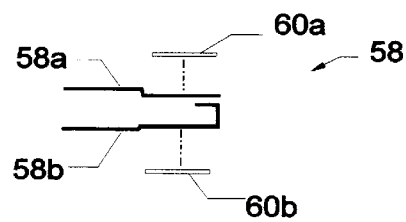
FIG. 3C is a partial view of the switch components of the water sensor shown in FIGS. 3A and 3B.
Figure 4C:
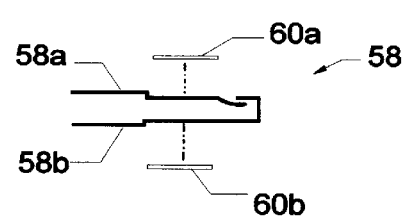
FIG. 4C is a partial view of the switch components of the water sensor shown in FIGS. 4A and 4B.

An additional aspect of the present invention is the provision of a reliable remote water sensor, generally referenced as 50. FIGS. 3A–3C depict an embodiment of a mechanical water sensor having a normally open switch configuration, and FIGS. 4A–4C depict an alternate embodiment mechanical water sensor having a normally closed switch configuration. As depicted in FIGS. 3A–3C, water sensor 50 comprises a sensor housing 52 incorporating mounting flanges 54 having apertures therein for receiving suitable fasteners to facilitate secure mounting. Sensor housing 52 further houses a mechanical switch, including movable switch elements 58a and 58b. Each switch element is independently associated with a quantity of hygroscopic material 60a and 60b, which material expands upon exposure to water thereby moving its respective switch element into electrical contact with the opposing switch element thus completing an electrical circuit in the preferred embodiment. Accordingly, the exposure of either material 60a or 60b shall be sufficient to close the switch thereby completing the circuit. Material 60a and 60b may be wafer like material known as hygroscopic washers. Housing 52 further includes notched cut-outs 56a, and 56b, existing on opposing sides of housing 52, for exposing the water responsive material, 60a and 60b, to any water accumulating in proximity to the housing. Housing 52 further includes a top portion defining an air vent aperture 53 for allowing water to rise within the housing by allowing air to escape therefrom, thereby insuring the complete wetting of the hygroscopic material. Thus, the exposure of either water responsive material 60a and 60b causes the completion of the electrical circuit thereby triggering the motorized actuator to close valve 14.

As further depicted in FIGS. 4A–4C, water sensor 50 may include movable switch elements 58a and 58b configured normally closed. In the normally closed configuration, switch elements 58a and 58b are in electrical contact and each switch element 58a and 58b is independently associated with a quantity of hygroscopic material 60a and 60b, which material expands upon exposure to water thereby moving its respective switch element in a direction away from the opposing switch element such that an electrical circuit is broken.

Figure 8A:
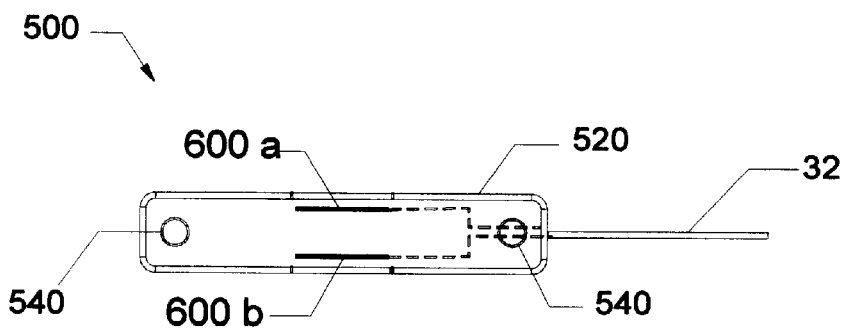
FIG. 8A is a bottom view of an alternate resistive type water sensor.
Figure 8B:
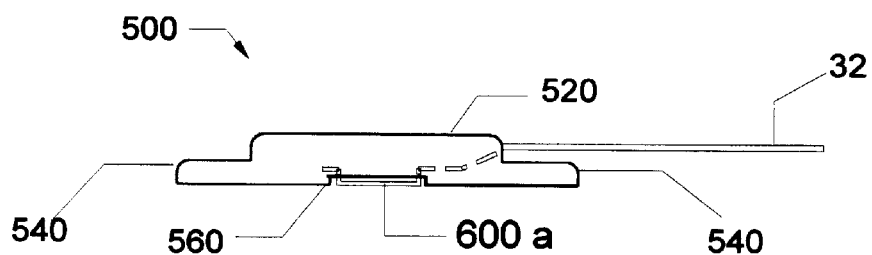
FIG. 8B is a side view of the sensor shown in FIG. 8A.
Figure 8C:
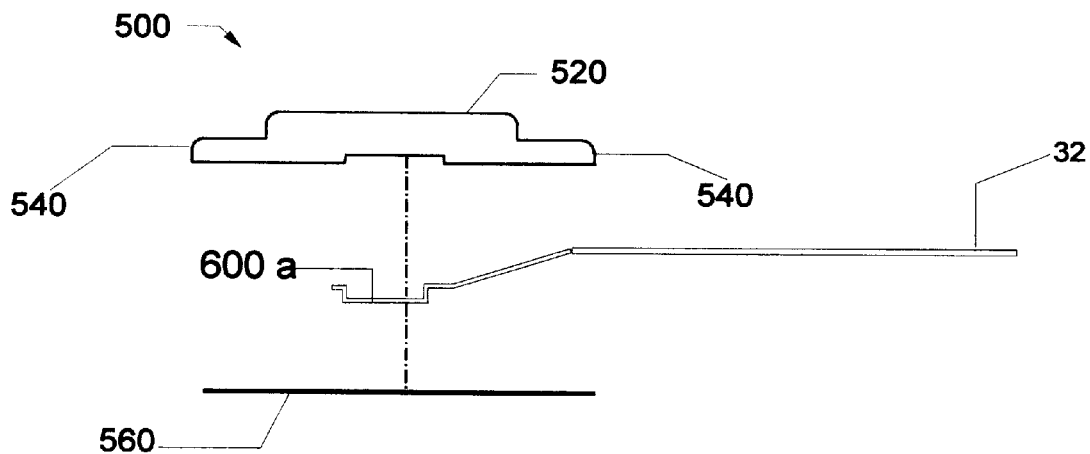
FIG. 8C is an exploded side view of the alternate resistive type water sensor.
Figure 9:
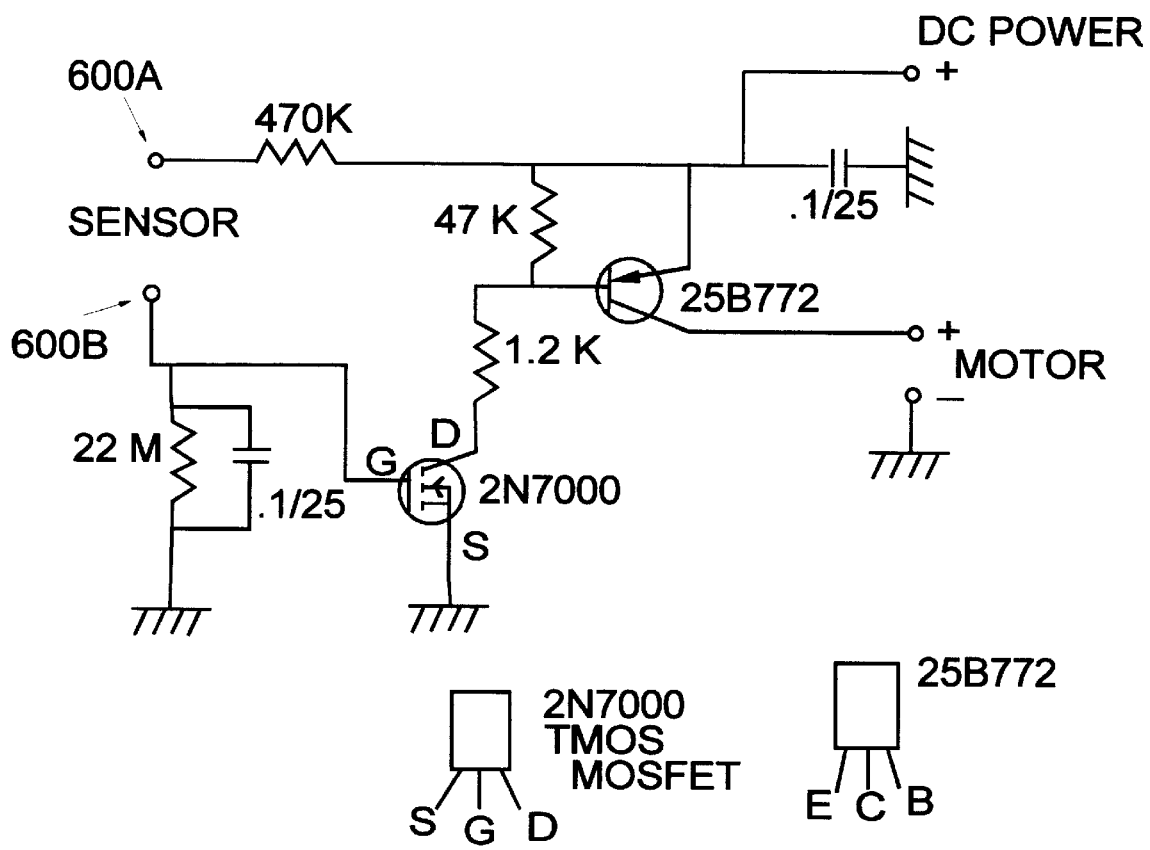
FIG. 9 is an schematic diagram of electrical switching circuitry and resistive sensor.

As previously discussed water sensor 50 is hard wired to motorized actuator 12. Furthermore, a plurality of sensors 50 may be electrically connected in parallel with a single motorized actuator 12, thereby expanding the water sensing coverage of the system. It is believed that an embodiment with a single sensor hard wired directly to actuator 12 provides an economically attractive option for protecting a single appliance (e.g. hot water tank) and/or small area (e.g. laundry room) from flood damage; however, it may be desirable to hard wire a plurality of water sensors 50 to motorized actuator 12 for sensing water at a plurality of suitable locations, whereby any one sensor may trigger the actuator. For example, sensors may be strategically located proximate to selected appliances such as a clothes washing machine, hot water tank, dishwasher etc. In addition, it is contemplated that a resistive type sensor and switching circuitry as shown in FIG. 9, may be used in lieu of the mechanical sensor disclosed herein. FIGS. 8A–8C disclose a resistive sensor embodiment which is more fully discussed herein below.

Motorized actuator 12 may further include a manually actuated toggle switch 36 which is selectively movable between three positions. In the first position, actuator 12 is responsive to water sensor(s) 50 and, upon closure of a water sensor, generates rotational torque which is transmitted to valve stem 14*a* for closing the valve. In the second position, switch 36 is capable of energizing actuator 12 for allowing the user to close valve 14 by manual activation of toggle switch 36. In the third position, toggle switch 36 is capable of energizing actuator 12 in a rotational direction opposite from the rotational direction corresponding to the first switch position for the purpose of allowing the user to open valve 14 by manual activation of switch 36. Still another feature contemplated is an audible alarm 38, for producing an audible signal upon activation of motorized actuator 12 thereby alerting the occupants of the dwelling that the system has detected a water leak. The inventor further contemplates that an audible alarm and reset button 38 may be incorporated into the present invention in any suitable combination, and further that it may be desirable to include a low battery indicator for battery powered embodiments.

As is now apparent, the present invention provides a water triggered water shut-off system for use with a water supply line having a manual control valve. In addition, the invention may be used on the manual control valve for a specific appliance and may send a signal to shut the valve upon the detection of water. The system disclosed herein may be easily installed by the occupant of the dwelling in the following manner. First, a manual shut-off valve 14 on the water supply line 16 is located and the handle removed thereby exposing the valve stem 14*a*. Next, shaft 18 is secured to valve stem 14*a* by inserting the stem into connector 20 and anchoring the stem therein with set-screws 22. Next, the motorized actuator 12 is connected to shaft 18 such that the actuator can transmit rotational torque to shaft 18. Such an arrangement preserves manual actuation of the shut-off valve, since the valve may still be opened and/or closed by user rotation of the valve handle. In the preferred embodiment, battery power is supplied to power motorized actuator 12 by insertion of a suitable commercially available battery into a battery storage compartment associated with motorized actuator 12. Motorized actuator 12 is rotationally anchored relative to valve 14 by connecting an end of J-shaped anchor 24 to motorized actuator 12 and fixing the plastic coated J-shaped end to a portion of pipe next to the valve. Finally, the user mounts at least one water sensor 50 in a suitable location, such as the surface supporting a hot water tank, and secures the sensor by inserting conventional fasteners through mounting flanges 54 and into the supporting surface. Accordingly, should the hot water tank fail and leak water, the presence of water would be detected by sensor 50 when the water reaches water responsive material 60*a* and/or 60*b* through either sensor cut-out 56*a*, and 56*b*, existing on opposing sides of sensor housing 52, thereby causing expansion of water responsive material which forces movable switch elements 58*a* and 58*b* into electrical contact thereby completing an electrical circuit and energizing the motorized actuator 12 which generates rotational torque to shaft 18 thereby closing valve 14. Accordingly, the water supply to the dwelling and/or appliance is interrupted causing the undesirable flow of water to cease.

FIGS. 5A and 5B depict an alternate embodiment for the present invention wherein the motorized actuator 12 is not hardwired to sensor 50 by conductors 32. In the first alternate embodiment, sensor 50 is electrically connected to a radio frequency ("IRF") transmitter 60 which transmits a signal to a radio frequency receiver 62 associated with motorized actuator 12. In this embodiment, sensor 50 is mounted in the desired location with transmitter 60 mounted in an elevated location to prevent water from coming in contact with the transmitter.

In certain situations wherein the instant invention is to be used to shut-off a manual valve which is outside or otherwise exposed to the elements, it may be desirable to separate the motorized actuator 12 from RF receiver 62. In such circumstances the invention 10 will include motorized actuator 12, shaft 18 and connector 20, and a weather proof power cord 34*a* are installed on a valve which is exposed to the elements such as rain and snow, and RF receiver 62 is then located in a protected, non-exposed, environment and hard wired directly to the motorized actuator 12. Such a protected, non-exposed environment may be located remotely from motorized actuator 12, or it may comprise a weather proof enclosure attached thereto.

Also in an alternate embodiment power is supplied to motorized actuator 12 from an A.C. power source via an electric power cable 34*a*. Power cable 34*a* may comprise a pair of electrical conductors which can be wired directly to the electrical circuitry of an appliance, such as a control transformer; or, power cable 34*a* may comprise a power cord having a plurality of prongs for connection to a conventional A.C. power outlet. Accordingly, it is understood that while only one A.C. power source is necessary; and further, neither is necessary if the battery powered embodiment is used.

As best depicted in FIGS. 5A, 5B, and 6, shaft 18 is mechanically connected to motorized actuator 12 for transmitting rotational torque to a valve stem 14*a* for selectively opening and closing a valve 14. Shaft 18 includes a valve stem connector 20 including a plurality of offset set screws 22 for rigidly connecting connector 20 to a valve stem 14*a*. In addition, shaft 18 includes a second end upon which a manual valve handle 14*b* may be removably mounted should the user elect to remove actuator 12 and operate the valve manually. Thus, once the actuator 12 has been removed from the valve 14 the valve handle 14*b* may be mounted on the second shaft end 18*b* such that full manual actuation of the valve is maintained.

Figure 7A:
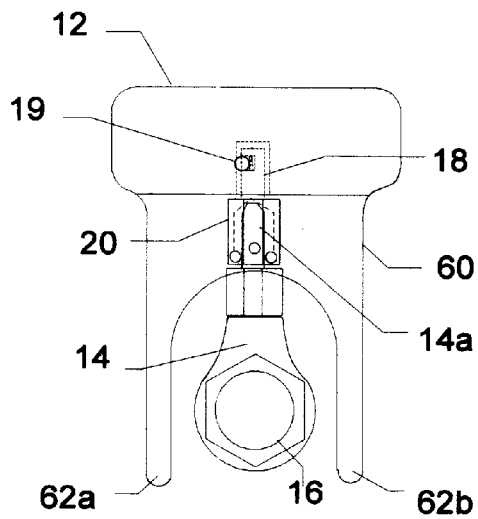
FIG. 7A is a rear elevational view of a motorized actuator incorporating an alternate embodiment anchoring structure, installed on a valve.
Figure 7B:
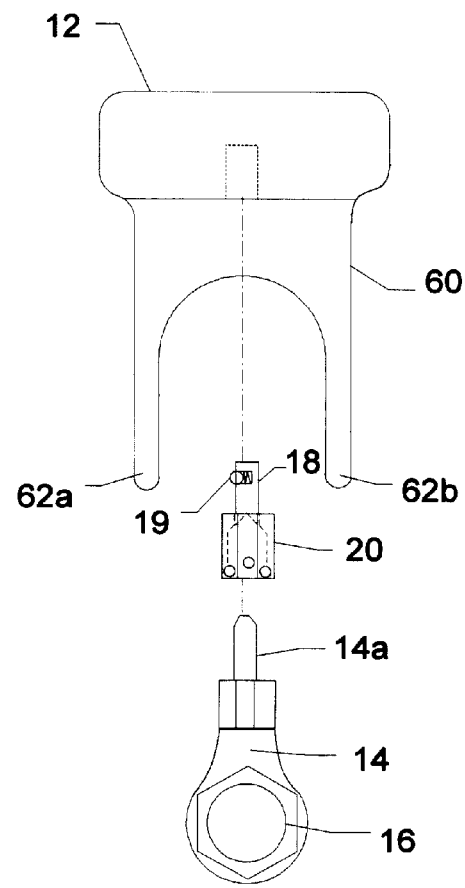
FIG. 7B is an exploded view of the alternate embodiment depicted in FIG. 7A.

FIGS. 7A and 7B depict an alternate embodiment motorized actuator 12' including an integral anchoring structure 60 for preventing the motorized actuator from rotating. Structure 60 includes forked rigid members 62*a* and 62*b*. Structure 60 is used in lieu of anchor 24 to rotationally anchor motorized actuator 12' relative to valve 14. As depicted in FIG. 7, alternate motorized actuator 12' is mounted on shaft 18 and thereby coupled to valve stem 14*a*, which mounting results in structure 60 and particularly forked rigid members preventing rotational movement of motorized actuator 12'.

As seen in FIG. 7, a portion of valve 14 or pipe 16 is disposed between forked rigid members 62a and 62b thereby functioning to maintain members 62a and 62b substantially rotationally anchored relative to valve 14.

In this embodiment, shaft 18 includes a spring loaded ball assembly 19, which functions to anchor shaft 18 within the generally square cross-sectional aperture defined in motorized actuator 12. Shaft 18 preferably has a generally square cross-section for being received, in locking engagement, within a generally square cross-sectional aperture defined in motorized actuator 12. In this embodiment the aperture defined in motorized actuator 12 preferably includes a recessed portion for receiving a portion of the ball of spring loaded ball assembly 19 in removably locking engagement therewith. While shaft is square in the preferred embodiment, it should be apparent that any cross-sectional shape capable of locking engagement with the motorized actuator is within the scope of the invention.

FIGS. 8A–C, and 9 depict an alternate embodiment water sensor comprising a resistive sensor 500. Resistive sensor 500 includes a sensor housing 520 incorporating mounting flanges 540 having apertures therein for receiving suitable fasteners to facilitate secure mounting. Sensor housing 520 further includes a base plate 560 and spaced electrical conductors 600a and 600b, which are connected to resistance measuring circuitry associated with actuator 12, or transmitter 60, by insulated conductor portions 32. When resistive sensor 500 is exposed to a uniform body of water which bridges the gap existing between spaced conductors 600a and 600b, the change in resistance in detected by resistance measuring circuitry thereby causing the actuation of motorized actuator 12. FIG. 9 provides an electrical schematic view of one embodiment of suitable resistive sensor and switching circuitry for achieving the functional results disclosed herein.

It should be noted that use of the present invention is not limited to use in connection with water valves since the motorized actuator is capable of use with any manually actuated device, such as a hand crank for automatically closing a window or the like to prevent rain from entering a dwelling. Thus, the instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. An apparatus for use with an existing manual water valve having a rotatable valve stem, said apparatus for preventing water damage by automatically closing the water valve upon sensing water leaking from a source downstream from the water valve, said apparatus comprising:

at least one water sensor, said at least one water sensor including a pair of spaced conductors forming a normally open electrical switch, said apparatus including resistance measuring circuitry whereby a uniform body of water bridging a gap between said spaced conductors completes an electrical circuit;

means for rotationally actuating said manual valve connected to said valve stem by a connector, said connector formed about a connector axis and having an end defining an aperture which is coaxial with said axis, said connector aperture terminating at a concavely tapered surface for aligning said valve stem in axial alignment with said connector axis, said means for rotationally actuating electrically connected to said at least one water sensor and responsive to said electrical switch such that said means for actuating causes rotation of said valve stem for closing said valve upon completion of said electrical circuit.

2. An apparatus according to claim 1, wherein said water sensor includes a housing having a pair of opposing side walls, at least one of said side walls having a lower edge portion defining a cut-out, said housing containing a pair of spaced conductors.

3. An apparatus according to claim 1, wherein said connector further defines a plurality of radial threaded set-screw apertures for receiving a plurality of corresponding set-screws, said set-screws for rotationally anchoring said valve stem to said connector.

4. An apparatus for use with a manual water valve having a rotatable valve stem, said apparatus for preventing water damage by automatically closing the water valve, by rotating the valve stem, upon sensing water leaking, said apparatus comprising:

at least one water sensor, said at least one water sensor including a housing having a pair of opposing side walls, each of said side walls having a lower edge defining a notch, said housing further having a normally open mechanical switch including a pair of movable switch elements and a pair of hygroscopic wafers, said wafers having the characteristic of expansion upon exposure to water, each of said wafers disposed between one of said side wall notches and one of said movable switch elements, whereby water entering said housing through one of said notches will cause expansion of at least one of said wafers thereby closing said switch;

means for generating rotational torque;

a mechanical couple connecting said means for generating rotational torque to the valve stem;

said means for generating rotational torque electrically connected to said at least one water sensor whereby closure of said switch completes an electrical circuit thereby activating said means for generating rotational torque and rotating said valve stem;

said mechanical couple including a shaft having a first end connected to said means for generating rotational torque and a second end, said second end including a valve stem connector defining a valve stem receiving aperture for receiving the valve stem therein, said connector further including means for anchoring said valve stem to said connector such that rotation of said shaft causes rotation of the valve stem for closing the valve.

5. An apparatus according to claim 4, further including a handle adapted for mounting on said shaft, whereby manual actuation of the valve is maintained by removal of said means for generating rotational torque and mounting said handle on said shaft second end.

6. An apparatus according to claim 4, further including means for anchoring said means for generating rotational torque relative to the valve.

7. An apparatus according to claim 6, wherein said means for anchoring includes an elongated rigid member having a first end connected to said means for generating rotational torque and a second end adapted to be fixed to a portion of pipe.

8. An apparatus according to claim 7, wherein said elongated rigid member second end is arcuate and includes a plastic outer coating.

9. An apparatus, for use with a manual water valve having a rotatable valve stem, said apparatus for preventing water damage by automatically closing the water valve upon sensing water, said apparatus comprising:

at least one water sensor, said at least one water sensor including a housing having side walls defining lower edge forming at least one notch, said housing further containing a pair of spaced electrical contacts, said contacts electrically connected to a resistance measuring circuit, said contacts and said circuit functioning as a normally open electrical switch whereby the presence of a uniform body of water between said contacts closes said switch;

means for generating rotational torque;

a mechanical couple connecting said means for generating rotational torque to the valve stem;

said mechanical couple including a shaft having a first end connected to said means for generating rotational torque and a second end, said second end including a valve stem connector defining an axial valve stem receiving aperture for receiving the valve stem therein, said connector aperture having a concavely tapered surface, said surface for guiding said valve stem to a position in axial alignment with said connector axis, said connector further including means for anchoring said valve stem to said connector such that rotation of said shaft causes rotation of the valve stem for closing the valve;

said means for generating rotational torque electrically connected to said at least one water sensor whereby closure of said switch activates said means for generating rotational torque thereby causing rotation of said mechanical couple and the valve stem;

a rigid member having a first end fixed to said means for generating rotational torque and a second end fixed relative to the valve, for rotationally anchoring said means for generating rotational torque relative to said valve.

10. An apparatus according to claim 9, wherein said rigid member second end defines an arcuate portion, said arcuate portion having an external coating, said external coating comprising an electrically insulating material.

11. An apparatus according to claim 9, wherein said electrical connection between said means for generating rotational torque and said at least one water sensor includes an RF transmitter and an RF receiver.

* * * * *